March 25, 1941.  B. B. KAHN  2,235,886
STOVE
Filed Nov. 16, 1938  2 Sheets-Sheet 1
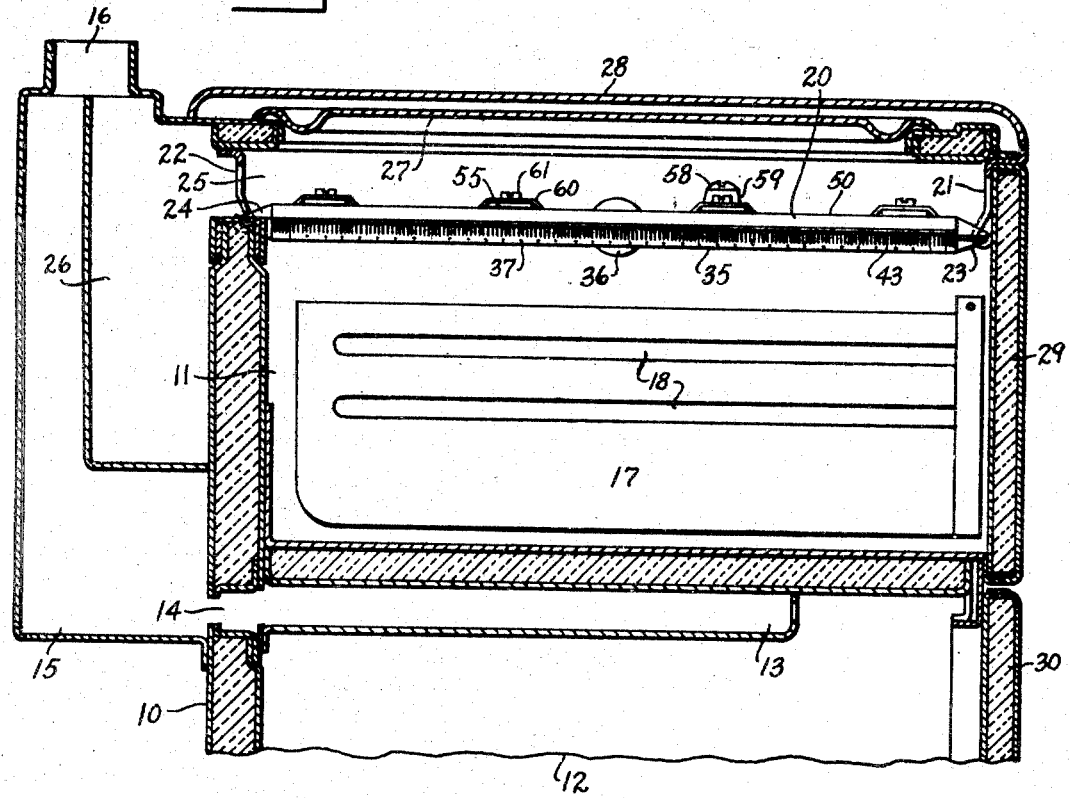
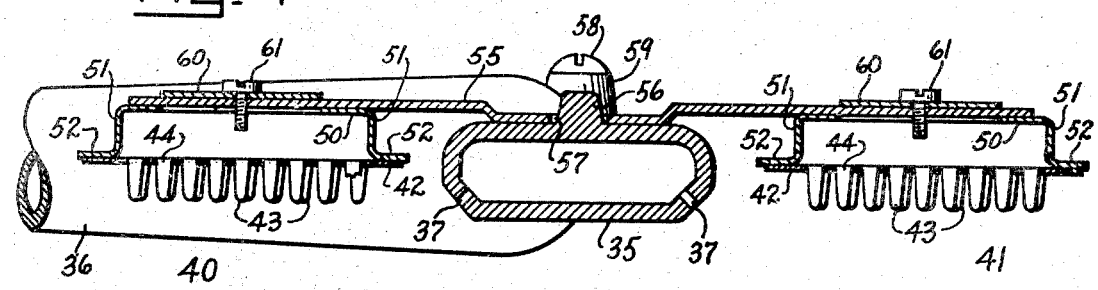
Inventor
Bertrand B Kahn
By Mareschal & Noe
Attorneys.

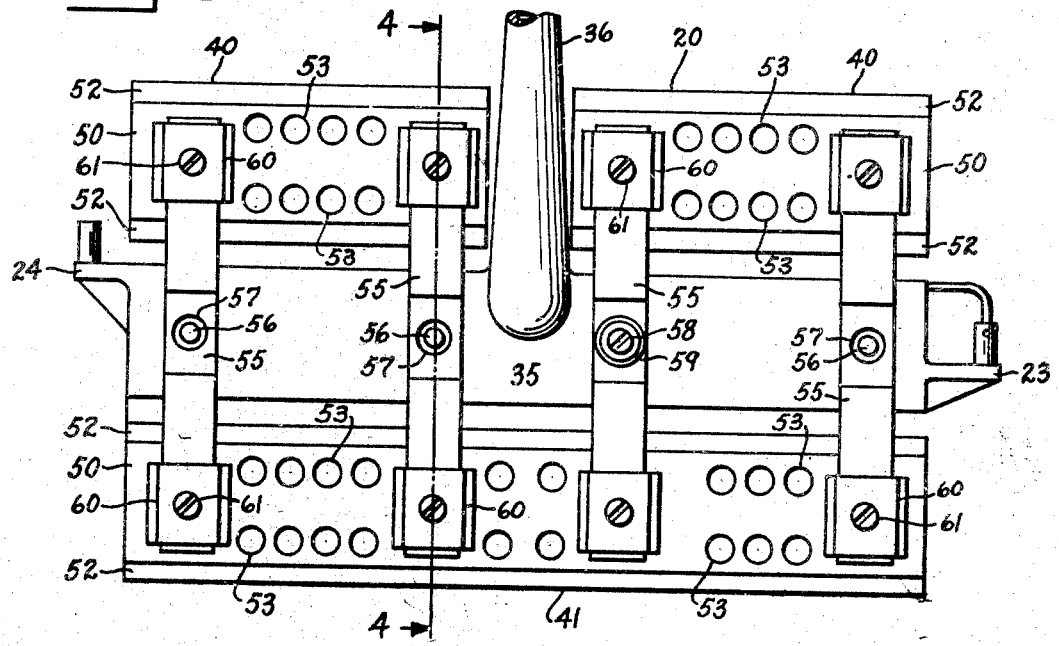
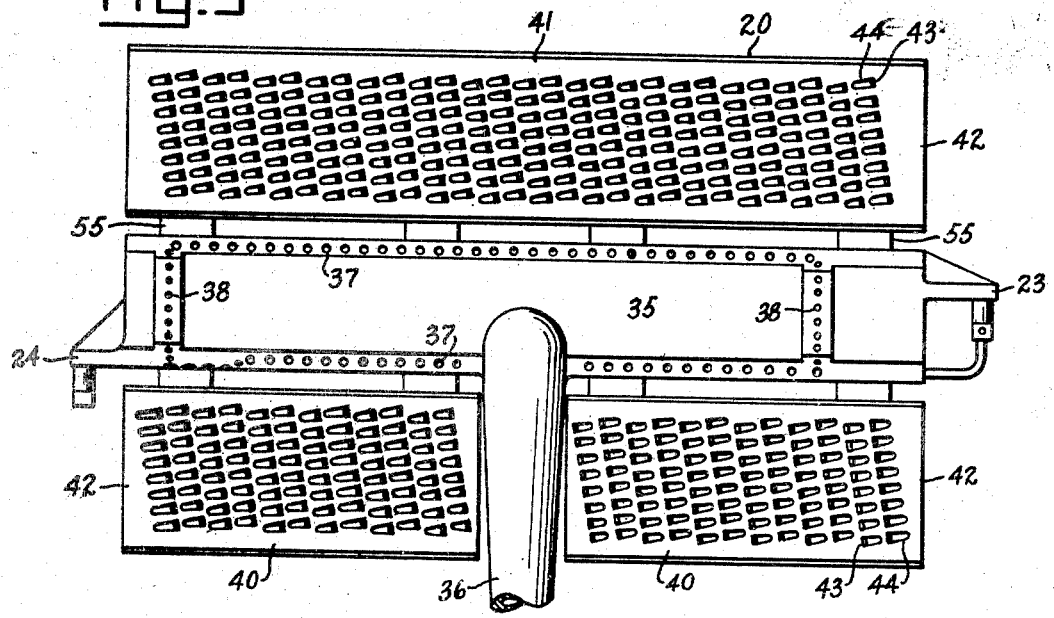

Patented Mar. 25, 1941

2,235,886

UNITED STATES PATENT OFFICE 2,235,886

STOVE

Bertrand B. Kahn, Cincinnati, Ohio, assignor to The Estate Stove Company, Hamilton, Ohio, a corporation of Ohio Application November 16, 1938, Serial No. 240,798

4 Claims. (Cl. 126—41)

This invention relates to radiants and more particularly to a radiant device for the broiler burner of a cooking range.

A principal object of the invention is the provision of a radiant device that is adapted to be heated by a broiler burner and provides for the rapid, uniform and economical supplying of an exceptionally large amount of radiant heat.

A further object is the provision of a unitary radiant device of this character that is rigid in construction, durable in use, and inexpensive to manufacture.

A further object is the provision of a broiler burner unit having a radiant heating area adapted to be rapidly and uniformly heated to a high degree of radiant heat and providing for the continuous and positive withdrawal of products of combustion upwardly through the radiant area when the burner is ignited.

A further object is the provision of a range having a broiler burner provided with radiant devices that are uniformly heated to a high degree of radiance by the burner and provide for the withdrawal of hot products of combustion upwardly therethrough into a space above the burner unit where they may serve to uniformly heat a griddle plate positioned above the burner and radiant devices.

Other objects and advantages will be apparent from the following description, the appended claims, and the accompanying drawings which illustrate a preferred embodiment of the invention, and in which:

Fig. 1 is a fragmentary, transverse sectional view taken through the broiler compartment of a cooking range and showing a broiler heating unit constructed in accordance with the invention in place therein;

Fig. 2 is a top plan view of the broiler heating unit illustrated in Fig. 1 and shows the burner element with the radiant devices supported adjacent each side thereof;

Fig. 3 is a bottom plan view of the heating unit illustrated in Fig. 2; and

Fig. 4 is a transverse sectional view taken on the line 4—4 of Fig. 2.

Referring to the drawings, which illustrate a preferred embodiment of the invention and in which like reference characters designate like parts in the several views, the reference numeral 10 designates a gas range which, in the illustrated embodiment, is provided with a separate broiler compartment 11 positioned above an oven section 12, only the upper portion of the oven being shown. The oven 12 is heated in the usual manner by means of a burner positioned at the bottom thereof and the products of combustion which pass upwardly through the oven are withdrawn through the passageway 13 and opening 14 into a duct 15 which opens into an outlet flue 16 adapted to receive the usual chimney. The broiler compartment 11 is provided with a broiler lining 17 having inwardly projecting ribs 18 adapted to support a broiler pan at various levels therein and is heated by means of a broiler heating unit 20 positioned above the lining 17 and adapted to uniformly supply a large amount of radiant heat downwardly toward the broiler pan.

The broiler heating unit 20 is supported by means of straps 21 and 22 which hang downwardly from the stove structure and engage suitable lugs 23 and 24 that project outwardly from the heating unit. The products of combustion from the broiler burner pass upwardly through the unit 20 and are withdrawn through an opening 25 into a duct 26 which also opens into the outlet flue 16. The duct 26 extends longitudinally of the stove and serves to conduct the products of combustion from the cooking top burners and other heating sections of the stove to the outlet 16. It will be noted that the broiler heating unit 20 is so mounted relative to the opening 25 that substantially all of the products of combustion must pass upwardly through the unit into the space above the burner unit where they serve to uniformly heat a griddle plate 27 carried by the stove directly above the broiler heating unit. A cover lid 28 hingedly mounted on the stove structure serves to cover the griddle plate 27 when the broiler or griddle plate is not in use. Access to the broiler and oven compartments is obtained through the front closure members 29 and 30.

As best shown in Figs. 2 to 4 the broiler heating unit 20 comprises a burner element and a plurality of metallic radiant devices positioned laterally of the burner element and adapted to be heated thereby to increase the amount of radiant heat supplied by the burner and provide a relatively large radiant heating area above the broiler pan. As shown the burner element comprises a relatively flat, elongated, hollow burner casting 35, closed at its ends, and provided adjacent the center with an integral laterally projecting supply pipe 36 adapted to connect with a fuel supply manifold carried by the range. The supporting lugs 23 and 24 are cast integral with the burner element 35 and project outwardly at the ends thereof in the manner shown.

The hangers 21 and 22 and supporting lugs 23 and 24 are so constructed that the entire burner unit may be conveniently and quickly removed from or placed within the range. In positioning the unit in the stove the inner lug 24 is first engaged over support 22, and outer lug 23 then dropped in position on support 21. A longitudinal row of laterally directed fuel outlet ports 37 is provided in each of the side portions of the casting 35 which are adapted to project jets of flame laterally of the burner element when the burner is ignited. As shown in Figs. 3 and 4 the greater portion of the ports 37 are positioned in a portion of the casting side wall that is suitably inclined to cause the flame jets from these ports to be projected in a downwardly inclined direction as well as laterally when the burner is in place on the range, this arrangement providing for the uniform heating of the radiant devices across the entire width thereof. To assist in igniting all of the burner ports 37 a transverse row of fuel outlet ports 38 is provided adjacent each end of the casting 35. As shown the row of ports 38 adjacent the closure member 29 is spaced further from the end of the burner than the rear row and the side ports 37 terminate at this point, such arrangement providing a desired distribution of heat and facilitating ignition of the burner without danger of burning the operator.

As noted above the metallic radiant devices are supported adjacent the sides of the burner element and are adapted to be heated by the jets of flame projecting therefrom. In the illustrated embodiment of the invention in which the supply pipe 36 extends laterally from the center of the burner element 35 a pair of relatively short radiants 40 are provided on each side of the supply pipe while a single radiant 41 that extends substantially the full length of the casting 35 is provided on the opposite side of the burner element. Each of the radiants 40 and 41 is of similar construction and comprises a radiant plate member 42 constructed from a relatively thin sheet of suitable heat resisting alloy metal such as a nickel-chromium alloy, and having a large number of relatively narrow elongated tongues 43 stamped from the metal sheet and bent to lie substantially perpendicular to the plane of the plate. In the assembled device the tongues 43 extend downwardly into the path of the laterally projected flame jets and being constructed from relatively thin sheet metal are adapted to be rapidly heated to a temperature such as to cause high degree of radiance.

To provide a large number of tongues each of which is rapidly and uniformly heated to a high degree of radiance the tongues 43 are arranged in rows with the face portions thereof lying in planes that extend laterally of the burner and at an angle to the flame jets projected therefrom, this angle and the spacing between the rows being such that the face portion of each tooth is directly exposed to a flame and the entire cumulative width of the flame jets is utilized in heating the tongues. Thus as shown in Fig. 3, the teeth of each row are offset from each other by an amount just sufficient to cause the face portion thereof to be directly exposed to the flames projecting from the burner element and the rows are so spaced that the innermost tooth of one row is correspondingly offset from the outermost tooth of the next adjacent row. To provide a maximum number of tongues within a given area the tongues in alternate rows are somewhat offset from the corresponding tongues in the adjacent rows as shown in Figs. 3 and 4, the arrangement being such that the corresponding tongues in each pair of rows have the faces thereof normal to the same straight line. The arrangement of the tongues with the face portions lying in the plane of the angularly extending rows permits the provision of a large number of tongues and at the same time causes the flames to impinge upon such face portions and thus provide for heating the tongues more rapidly and to a higher degree of temperature.

The stamping of the tongues 43 from the plate 42 provides openings 44 in the plate that lie adjacent each of the tongues and have a size corresponding to the size of the tongues. These openings are thus of substantial size and provide for the free passage of products of combustion upwardly through the radiant member without danger of the openings becoming clogged by the spattering of particles of grease, food, and the like. For example, a radiant member of this character in which the tongues are of the order of ⅛ inch wide and ⅜ inch long and are arranged in rows spaced ½ inch apart has been found highly satisfactory in use both as to supplying the desired amount of radiant heat and as to maintaining the openings free for the upward passage of the products of combustion.

The radiant plate member 42 is supported by a reinforcing member that adds rigidity to the relatively thin apertured plate 42 and provides a strong, light weight radiant device. As shown a channel-shaped member 50 constructed from relatively inexpensive sheet metal and provided with depending side portions 51 and outturned flanges 52 is arranged adjacent the upper face of the plate 42 with the depending side portions 51 serving to space the supporting member from the radiant plate member. The reinforcing and supporting member 50 extends the entire length of the radiant member and is rigidly attached to plate 42 along the length of the flanges 52 by suitable means such as spot welding. The hot products of combustion from the burner element 35 pass upwardly through openings 44 into the space between the member 50 and plate 42 and a plurality of relatively large openings 53 provided in the top of member 50 serve to vent the hot combustion products upwardly from this space. The hot products of combustion are thus continuously withdrawn upwardly through the openings 44 and 53 and when the burner unit is positioned beneath a griddle plate, as illustrated in Fig. 1, serves to uniformly heat the griddle plate as hereinabove pointed out. Since the supporting member 50 is spaced from the plate 42 it operates at a much lower temperature than the radiant plate and accordingly can be made from ordinary steel or the like which is a less expensive material than the heat resisting alloy from which the radiant plate member is constructed to make it durable under the high heat condition at which it operates. The cost of the device is further reduced while maintaining adequate strength and durability by the provision of the supporting member 50 which serves to reinforce and stiffen the radiant plate member, thus permitting the use of a relatively thin sheet of the more expensive heat resisting metal. There is thus provided a light weight and inexpensive radiant device that is strong, rigid and durable in use.

To provide a unitary burner and radiant structure the radiant devices are carried by the burner element 35 and are supported thereon by means of bars or straps 55 that extend transversely of the burner element and seat on the top of the casting 35. The straps are maintained in proper position on the burner element by means of upwardly projecting lugs 56 that are cast integral with the casting 35 and are received within openings 57 provided in the straps 55. As shown in Figs. 2 and 4 the openings 57 have a diameter that is somewhat larger than the diameter of the lugs 56 to provide for relative expansion between the various parts upon operation of the burner. A single screw 58 threaded into one of the lugs 56 and engaging a conical-shaped retaining sleeve 59 serves to normally prevent the supporting straps from lifting off of the lugs. The radiant devices are supported on the straps 55 by means of stirrups 60 that are punched outwardly from the metal of the supporting member 50 and fit over the ends of the straps. Screws 61 thread into the straps 55 and serve to rigidly attach the radiant devices to the straps. The burner with the radiant devices thus attached is adapted to be readily and inexpensively formed, is highly efficient and effective in operation, and is such that it does not tend to become contaminated with food and may be easily kept in a clean and sanitary condition.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A radiant device of the character described comprising a relatively thin, light weight plate member constructed from a heat resisting metal and provided with a plurality of elongated tongues stamped from said plate and bent to project outwardly from one face of the plate, and a sheet metal supporting member arranged adjacent the opposite face of said plate member and rigidly attached to the plate member with a spacing therebetween, said supporting member having a size substantially the same as said plate member and serving to reinforce and stiffen the plate member throughout substantially its entire extent.

2. A radiant device of the character described comprising a relatively thin, light weight plate member constructed from a heat resisting metal and provided with a plurality of elongated tongues stamped from said plate and bent to project substantially perpendicular to one face of the plate, a channel-shaped supporting member constructed from relatively inexpensive sheet metal and arranged adjacent the opposite face of said plate member with the side portions of said channel member providing a spacing between the supporting member and the plate member, said channel member being rigidly attached to said plate member and serving to reinforce and stiffen the plate member throughout substantially its entire extent, and the wall of said channel member opposite said plate member having a plurality of openings adapted to vent the space enclosed therebetween.

3. A radiant device of the character described comprising a relatively thin, light weight plate member constructed from a heat resisting metal and provided with a plurality of elongated tongues stamped from said plate and bent to project outwardly from one face of the plate, said tongues being arranged in rows with the face portions thereof lying in planes that extend laterally of said plate, the tongues of each row being offset from each other and the innermost tongue of one row being correspondingly offset from the outermost tongue of the next adjacent row, and a supporting member arranged adjacent the opposite face of said plate member and rigidly attached to the plate member with a spacing therebetween, said supporting member serving to reinforce and stiffen said plate member throughout substantially its entire extent.

4. A radiant assembly of the character described comprising a pair of radiant devices, each of said radiant devices comprising a relatively thin, light weight, metallic plate member having a plurality of elongated tongues stamped from said plate and bent to extend downwardly from the bottom thereof and a supporting member arranged adjacent the top of said plate member and rigidly attached to the plate member with a spacing therebetween, said supporting member serving to reinforce and stiffen said plate member throughout substantially the entire extent of the plate member, and a plurality of strap members secured to each of said radiant devices for supporting said plate members and said downwardly extending tongues as a unit and in predetermined positioning with respect to each other.

BERTRAND B. KAHN.